United States Patent [19]

Draper et al.

[11] Patent Number: 4,629,048
[45] Date of Patent: Dec. 16, 1986

[54] FRICTION CLUTCHES

[75] Inventors: Colin R. Draper, Leamington Spa; Steven Trotman, Snitterfield; Christopher M. Bowden, Leamington Spa; Keith A. Turfrey, Kenilworth, all of England

[73] Assignee: Automotive Products plc, Leamington Spa, England

[21] Appl. No.: 818,893

[22] Filed: Jan. 14, 1986

Related U.S. Application Data

[63] Continuation of Ser. No. 571,726, Jan. 18, 1984, abandoned.

Foreign Application Priority Data

Jan. 19, 1983 [GB] United Kingdom ............... 8301426

[51] Int. Cl.⁴ .............................................. F16D 13/44
[52] U.S. Cl. .............................. 192/70.27; 192/89 B; 267/161; 267/181
[58] Field of Search ............................ 192/70.27, 89 B; 267/161, 162, 166, 167, 181

[56] References Cited

U.S. PATENT DOCUMENTS

| | | | |
|---|---|---|---|
| 2,813,607 | 11/1957 | Haussermann | 192/89 B |
| 4,114,742 | 9/1978 | Rawlings | 192/89 B |
| 4,126,216 | 11/1978 | Babcock | 192/30 V |
| 4,465,267 | 8/1984 | Chatelin | 267/161 |

FOREIGN PATENT DOCUMENTS

| | | |
|---|---|---|
| 2244101 | 11/1975 | France . |
| 1065928 | 4/1967 | United Kingdom . |
| 1347485 | 2/1974 | United Kingdom . |
| 1549247 | 7/1979 | United Kingdom . |

Primary Examiner—John J. Vrablik
Assistant Examiner—Jane E. Obee
Attorney, Agent, or Firm—Solon B. Kemon

[57] ABSTRACT

A friction clutch comprises a cover member, a pressure plate mounted to the cover member by drive straps and a diaphragm spring interposed between the cover member and pressure plate so as to urge the pressure plate towards and into frictional engagement with a driven plate. The diaphragm spring has the usual outer belville portion and inwardly projecting fingers. The outer parts of the fingers themselves and particularly the junctions with the belville portion are stiffened by stiffening ribs which resist finger bending and thus reduce release travel. The ribs extend into and terminate within the belville portion without reaching its outer periphery. Fulcrum rings such as 17 incorporate raised bridge portions to provide clearance for the ribs.

3 Claims, 6 Drawing Figures

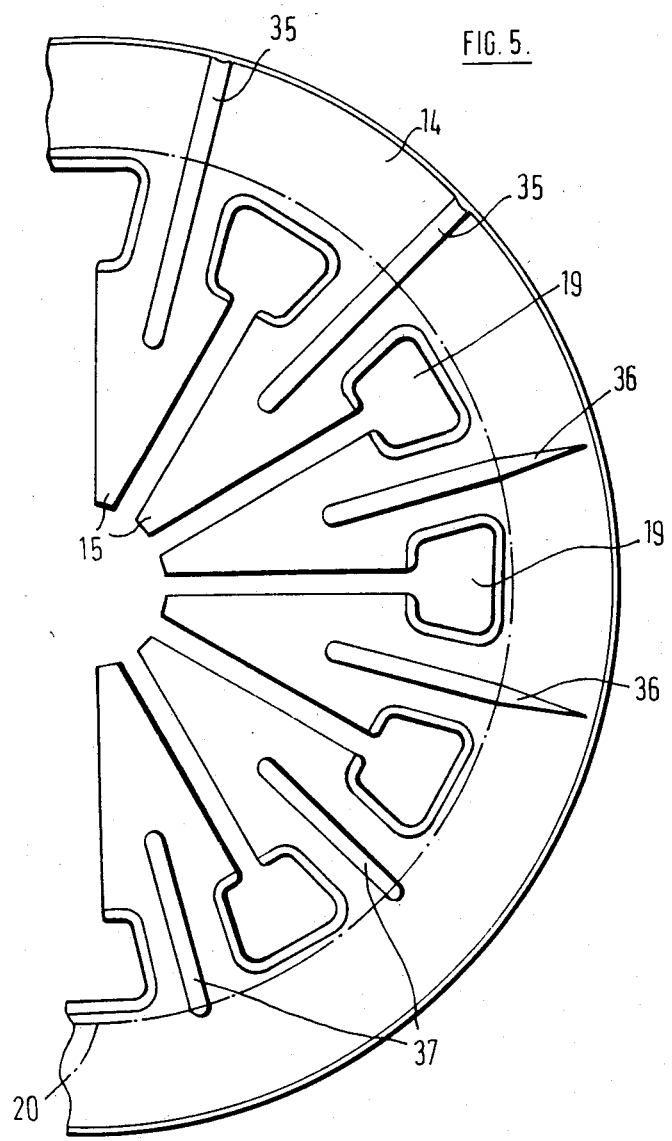

FRICTION CLUTCHES

This application is a continuation of application Ser. No. 571,726, flied Jan. 18, 1984, now abandoned.

BACKGROUND OF THE INVENTION

The invention relates to diaphragm spring friction clutches.

A typical diaphragm spring clutch comprises a cover member, a pressure plate mounted with respect to the cover member and a diaphragm spring interposed between the cover member and the pressure plate. In use the clutch is mounted on a flywheel and a driven plate is interposed between the flywheel and pressure plate. The diaphragm spring urges the pressure plate into frictional engagement with the driven plate and the driven plate into frictional engagement with the flywheel. A diaphragm spring typically incorporates an outer annular plate spring or belville portion and fingers projecting inwardly from the belville portion. The inner ends of the fingers are deflected in order to deform the belville portion and thus release the clutch. Flexibility in the fingers and particularly near the outer ends of the fingers results in an undesirable increase in the travel required in the clutch release mechanism to release the clutch. There have been various proposals to increase the stiffness of the fingers, for example by bending them to a shallow 'V' or channel section to in effect provide them with longitudinal ribs.

An objective of the present invention is to provide an improved diaphragm spring friction clutch with effective stiffening of the diaphragm spring fingers.

SUMMARY OF THE INVENTION

According to one aspect of the invention there is provided a diaphragm spring friction clutch having a diaphragm spring with an annular belville spring portion and fingers projecting inwardly from the belville portion, wherein the spring is provided with stiffening ribs along at least the outer part of the fingers, which ribs extend into and terminate within the belville portion. In other words, the outer ends of the ribs lie between but remote from the outer edge of the belville portion and the inner edge of the belville portion.

Typically, the outer parts of the fingers of a diaphragm spring are narrower than parts of the fingers inwardly thereof to provide mounting apertures for the diaphragm spring and it is preferable that the ribs extend inward beyond the inner ends of said narrower parts. The ribs may extend across less than 50% of the belville portion and preferably they extend across between 25% and 50% of this portion.

The ribs may be formed by pressing indentations into one face of the spring, causing the ribs to be raised on the opposite face.

In accordance with a second aspect of the invention there is provided a friction clutch comprising a cover member, a pressure plate mounted with respect to the cover member and a diaphragm spring interposed between the cover member and the pressure plate to urge the pressure plate towards and into frictional engagement with a driven plate, the diaphragm spring having an outer belville portion and fingers projecting inwardly from the belville portion and being pivotally mounted to the cover member about an annular fulcrum line near the roots of the fingers, wherein the spring is provided with stiffening ribs along the outer part of the fingers which ribs extend into and terminate within the belville portion.

A fulcrum ring provided for pivotting the diaphragm spring to the cover member may have raised bridge portions which extend over the ribs and allow the fulcrum ring to seat on the diaphragm spring between the ribs. The ribs may project from the diaphragm spring in a direction away from the cover member in which case the bridge portions of the fulcrum ring also project away from the cover member. Alternatively, a fulcrum ring may be provided with gaps to accommodate the ribs of the diaphragm spring. When the ribs project towards the cover member, a fulcrum ring between the cover member and the spring may be in discrete sections secured to the cover or the spring.

The invention also extends to a diaphragm spring for use in a friction clutch and having an annular belville spring portion and fingers projecting inwardly from the belville spring portion, wherein the spring is provided with stiffening ribs along at least the outer part of the fingers, which ribs extend into and terminate within the belville portion.

According to a still further aspect of the invention there is provided a friction clutch comprising a cover member, a pressure plate mounted with respect to the cover member and a diaphragm spring interposed between the cover member and the pressure plate to urge the pressure plate towards and into frictional engagement with a driven plate, the diaphram spring having an outer belville portion and fingers projecting inwardly from the belville portion and being pivotally mounted on the cover member about an annular fulcrum line near the roots of the fingers, wherein the spring is provided with stiffening ribs along the outer part of the fingers extending across the fulcrum line and wherein an annular fulcrum for the spring incorporates discontinuities providing clearance for the ribs at their intersection with the fulcrum line.

BRIEF DESCRIPTION OF THE DRAWINGS

Embodiments of the invention will now be described with reference to the accompanying drawings in which:

FIGS. 5 and 6 are views corresponding to figures 3 and 4 respectively showing a range of modifications.

DESCRIPTION OF A PREFERRED EMBODIMENT

Figure 1:
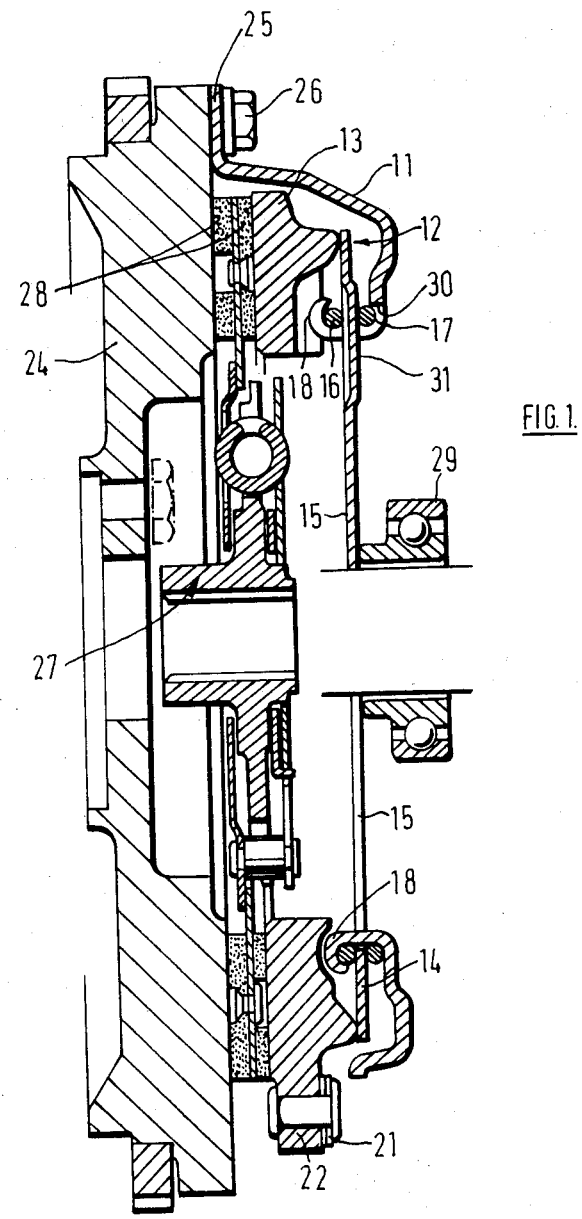
FIG. 1 is a section through a clutch according to the invention, showing the installation in conjunction with a flywheel and driven plate, the clutch itself being in section along line I—I of FIG. 2.
Figure 2:
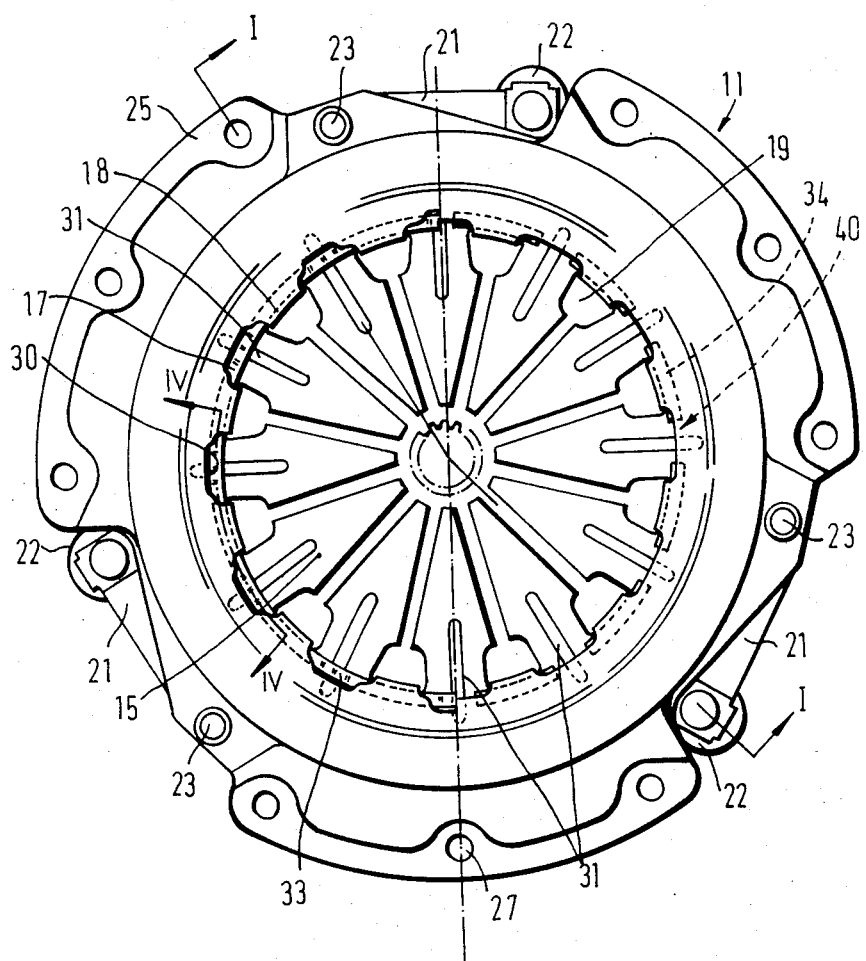
FIG. 2 is a composite end view of a clutch, the lefthand half corresponding to the clutch of FIG. 1 and the righthand side showing a modification.

The clutch shown in FIG. 1 and the lefthand half of FIG. 2 incorporates a pressed steel cover 11, a diaphragm spring 12 and a pressure plate 13. The diaphragm spring, also shown in FIG. 3, incorporates an outer belville portion 14 and inwardly directed fingers 15. The spring 12 is supported in the cover 11 about a circular fulcrum line 20 defined by two fulcrum rings 16 and 17. The fulcrum rings and the diaphragm spring 12 held between them, are located in position with respect to the cover 11 by bent-over tabs 18 which constitute an integral part of the cover 11. The tabs extend through mounting apertures 19 at the roots of the fingers 15, these mounting apertures being shown in FIG. 3.

Pressure plate 13 is located co-axially with the cover 11 and connected for rotation with the cover 11 by means of three drive straps 21 which extend between lugs 22 on the pressure plate and mountings 23 on the cover. The straps are sufficiently flexible to allow limited axial movement between cover and pressure plate.

The outer region of the belville portion 14 of diaphragm spring 12 engages against the pressure plate and tends to urge it in a direction out of the cover 11, that is to the left in FIG. 1. As shown in FIG. 1, the cover 11 is mounted on a flywheel 24 by an outer cover flange 25 and mounting bolts 26. A driven plate 27 is arranged between the pressure plate 13 and flywheel 24 so that flat driving faces of the pressure plate and flywheel engage frictionally with friction faces 28 of the driven plate. In this way, a driving connection is established from the clutch (and flywheel) to the driven plate.

In order to release the drive between the clutch and the driven plate, a release bearing 29 is engaged with the inner ends of the diaphragm spring fingers 15 to urge the fingers towards the flywheel. This movement of the release bearing causes the diaphragm spring to pivot about the fulcrum rings 16 and 17 so that the outer part of the belville tends to move away from the flywheel and hence to release the loading on the pressure plate which caused the pressure plate and flywheel to grip the driven plate. Thus movement of the release bearing through a sufficient distance completely releases the drive between clutch and driven plate. As thus far described, the clutch is of a kind which has become conventional in recent years and is described in U.K. Patent Specification No. 1 347 485.

Figure 3:
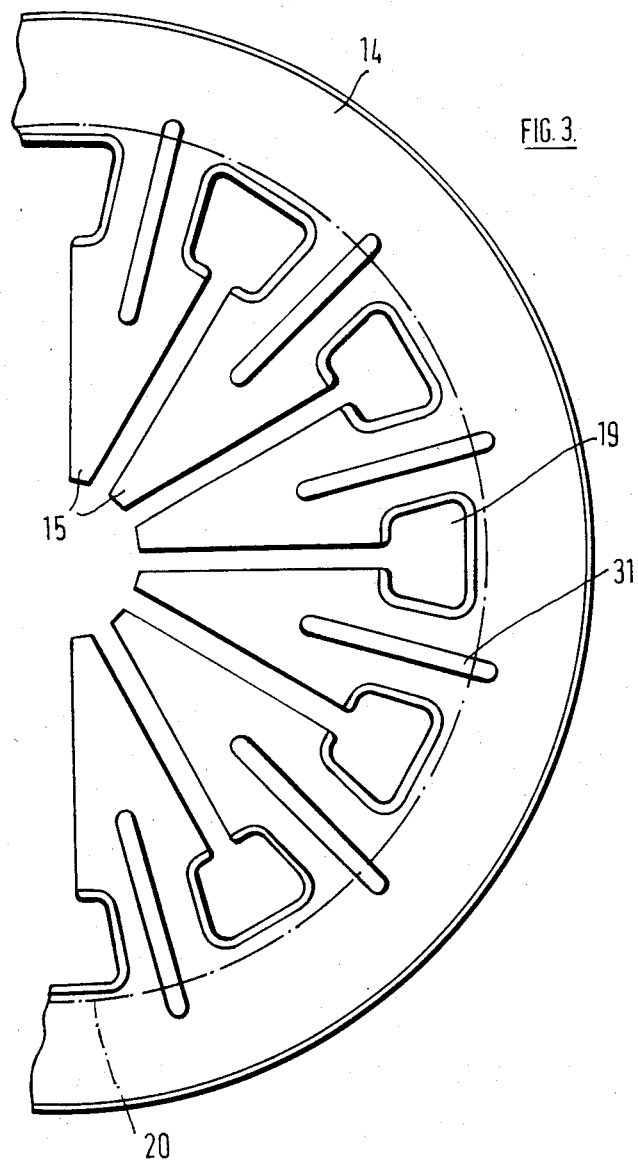
FIG. 3 is a section along line III—III of FIG. 2 showing the diaphragm spring mounting on a larger scale.
Figure 4:
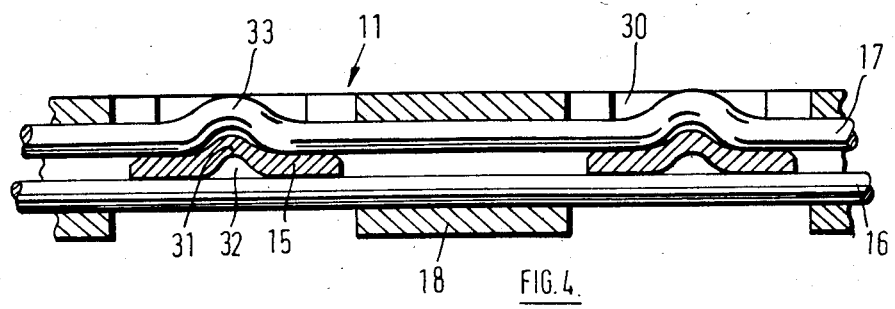
FIG. 4 is an end view of part of a diaphragm spring for incorporation into the clutch of FIGS. 1 and 2.

With the clutch as thus far described, and with other kinds of conventional diaphragm spring clutch such as those employing rivets in place of tabs 18 to secure the fulcrum rings, the distance of travel of release bearing 29 required to release the clutch is influenced by the flexibility of the diaphragm spring fingers 15 and of their connection to the belville portion 14. Excessive travel of release bearing 29 results in a requirement for either excessive travel of a driver operated clutch release pedal or of a low mechanical advantage in the release mechanism resulting in high pedal load. To. overcome this problem it has already been proposed to stiffen the fingers of the diaphragm spring and the present invention is concerned with an improved stiffening arrangement. As best seen in FIGS. 3 and 4 but also in the upper part of FIG. 1, the diaphragm spring is provided with raised ribs 31 arranged radially along the centre lines of the fingers 15. Ribs 31 are formed in a coining operation which forms an indentation 32 in one face of the spring and a raised rib 31 on the opposite face. The ribs traverse the whole of the narrow root portion of the fingers 15 between the mounting apertures 19 but also extend outwardly so that they terminate within the belville portion 14. In other words, the outer ends of the ribs lie between but remote from the outer edge of the belville portion and the inner edge of the belville portion. The inner edge of the belville portion is defined by the outer edges of apertures 19. In FIGS. 1 to 3 the ribs extend approximately one third of the distance across the belville from its inner edge. It is preferred that this distance should be between 25% and 50% of the distance across the belville. As shown in FIG. 3, the ribs 31 also extend inwardly beyond the inner extent of the mounting apertures 19. It has been found that these ribs, extending into and terminating within the belville portion stiffen the fingers themselves and their junction with the belville portion without detracting significantly from the operation of the belville portion. The stiffened fingers allow the clutch to be released fully by a shorter movement of the release bearing 29 which can in turn be translated into a reduction in pedal travel or pedal load.

In order to accommodate the rib 31 as it traverses the fulcrum rings 16 and 17, some modification of the conventional fulcrum ring design is necessary. As shown in FIG. 1, the lefthand portion of FIG. 2 and FIG. 4, the fulcrum ring 17 is provided with a series of raised bridge portions 33, the cover 11 being cut away slightly at 30 to provide recesses to accommodate these raised bridge portions. At least some of the recesses correspond in length to the length of the raised bridge portions to locate the fulcrum ring with respect to rotation about the clutch axis. The variation from a conventional fulcrum ring design and the modification of the cover do not affect the mounting of the diaphragm spring within the cover because the main mounting regions associated with tabs 18 lie between fingers 15 and associated ribs 31. As an alternative to cutting away part of the cover to accommodate the raised bridge portions 33, the cover may be provided with recesses pressed into it.

The righthand portion of FIG. 2 shows an alternative arrangement by which the ribs 31 may traverse the fulcrum ring 17. This fulcrum ring is divided into discrete sections 34, each of which extends under a tab 18 but terminates short of the ribs 33 to provide gaps 40 for the ribs. The fulcrum ring sections may be secured to the cover by spot-welding, although for small numbers of clutches for trial purposes, an epoxy resin adhesive has been employed. Alternatively the sections 34 may be secured to the diaphragm spring, e.g. by an epoxy resin.

FIG. 5 is a composite view of parts of a diaphragm spring showing three possible modifications to the ribs 31. At the top of FIG. 5, two ribs 35 are shown which do not terminate within the belville portion but extend to its outer periphery. In another modification, shown at the centre of FIG. 5, ribs 36 extend out very close to the outer periphery of the spring, but gradually taper in width and depth as they approach the outer periphery and so just terminate within the belville portion. The lower part of FIG. 5 shows shortened ribs 37 which extend only across about 25% of the belville portion.

The distance by which the ribs extend across the belville portion from its inner end may vary within wide limits. However they should extend sufficiently into the belville portion to effectively stiffen the transition between belville portion and finger. In some cases it is possible for a rib which is too long to interfere with the normal operation of the belville portion as a spring and for this reason it is preferred that the ribs should extend between 25% and 50% over the width of the belville portion.

Figure 6:
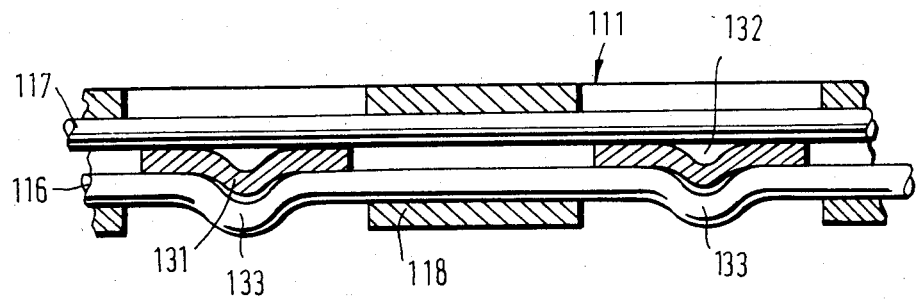

FIG. 6 is a view corresponding to FIG. 4 but showing a modification in which the rib 131 faces in the opposite direction, that is towards the pressure plate (not shown in FIG. 6). The rib is formed by a coining operation in conjunction with indentation 132. The cover member 111 and fulcrum ring 117 adjacent thereto correspond to those provided in the aforesaid UK Patent Specification No. 1347485 because there are no projections requiring modification thereof. Instead, the fulcrum ring 116 on the opposite side of the diaphragm spring, held in position by tabs 118, has raised bridge portions 133. In other respects the clutch may correspond with that shown in FIGS. 1 and 2.

We claim:

1. A friction clutch comprising a cover member, a pressure plate mounted with respect to the cover member and a diaphragm spring operative between the cover member and the pressure plate and arranged to urge the pressure plate towards and into frictional engagement with a driven plate, the diaphragm spring having an outer belville portion and fingers having outer and inner parts projecting inwardly from the belville portion and joined thereto by portions thereof defined as roots, an annular fulcrum line being defined on said diaphragm spring near the root of the fingers, mounting apertures for mounting said diaphragm spring to said cover defined between adjacent fingers adjacent the roots thereof, said apertures defining narrow root portions of said fingers therebetween a continuous annular fulcrum ring pivotally mounting said diaphragm spring about its annular fulcrum line to said cover, said spring further comprising stiffening ribs extending along the outer part of the fingers including said narrow root portions and extending across the fulcrum line, and the fulcrum ring for the spring comprising raised bridge portions providing clearance for the ribs at their intersection with the fulcrum line.

2. A friction clutch as claimed in claim 1 wherein the ribs project from the diaphragm spring in a direction away from the cover and the bridge portions of the fulcrum ring also project away from the cover.

3. A friction clutch as claimed in claim 1 wherein the ribs of the diaphragm spring and the bridge portions of said fulcrum ring project towards the cover member and the cover member is provided with recesses to accommodate the bridge portions.

* * * * *